Sept. 21, 1948.  F. J. BIAS ET AL  2,449,801
OSCILLOGRAPH APPARATUS
Filed Nov. 17, 1944
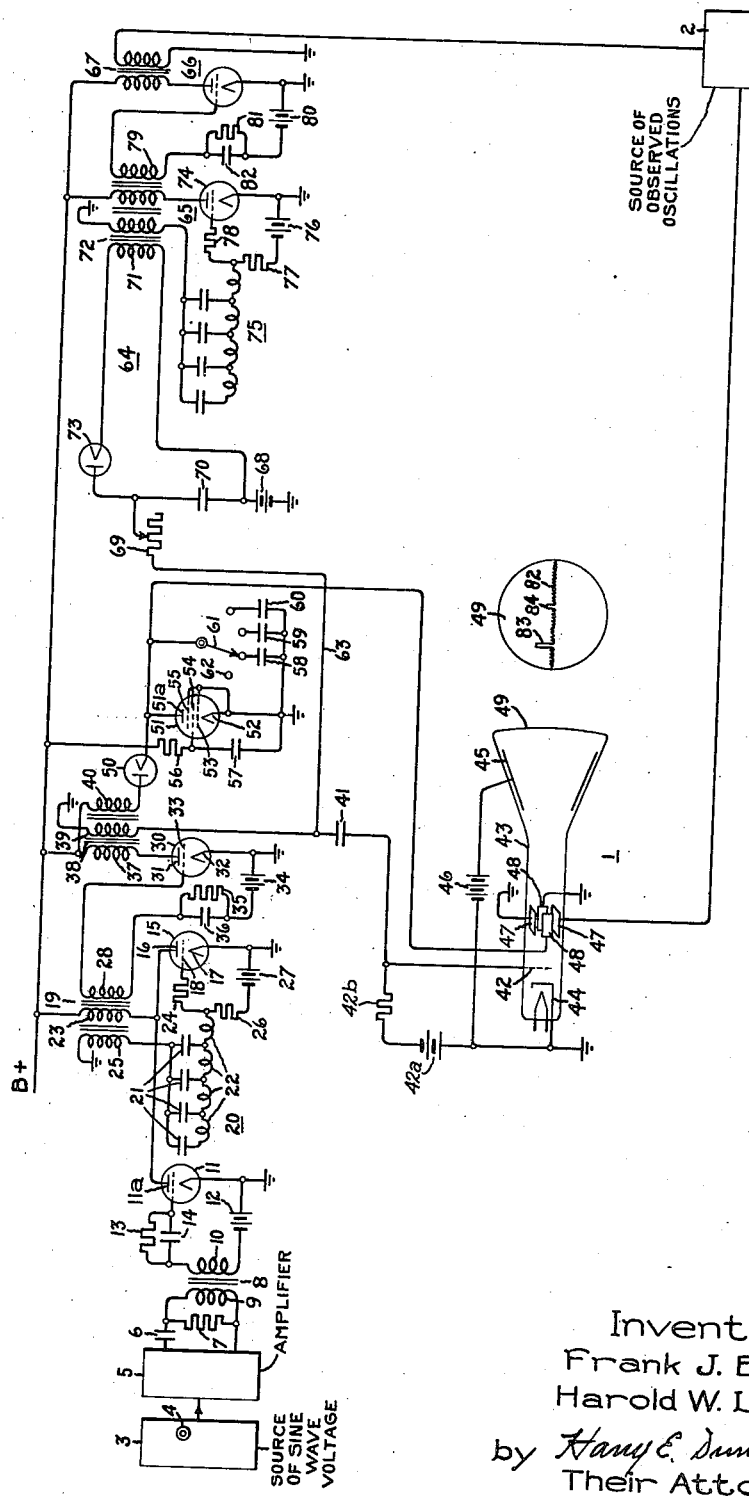
Inventors:
Frank J. Bias,
Harold W. Lord,
by Harry E. Dunham
Their Attorney.

Patented Sept. 21, 1948

2,449,801

UNITED STATES PATENT OFFICE 2,449,801

OSCILLOGRAPH APPARATUS

Frank J. Bias, Scotia, and Harold W. Lord, Schenectady, N. Y., assignors to General Electric Company, a corporation of New York Application November 17, 1944, Serial No. 563,920

2 Claims. (Cl. 315—24)

Our invention relates to apparatus for analyzing electric oscillations, and particularly to cathode ray oscillographs of the type used for wave analysis or in connection with radio detection and direction finding equipment.

It is a general object of our invention to provide a new and improved cathode ray oscillograph apparatus including means for synchronizing the operation of a source of oscillations to be observed or analyzed with the timing sweep of the electron beam.

It is a still further object of our invention to provide a cathode ray oscillograph apparatus in which a single source of recurrent voltage pulses synchronously controls the sweep of an electron beam, the intensity of the beam, and the "trigger" circuit controlling the source of oscillations to be analyzed.

Our invention itself, together with further objects and advantages thereof, will be more fully understood by referring now to the following detailed specification taken in conjunction with the accompanying drawing, the single figure of which is a schematic circuit diagram of a cathode ray oscillograph apparatus embodying our invention.

Referring now to the drawing, we have shown our invention applied to a cathode ray oscillograph apparatus comprising a cathode ray discharge device 1, a source 2 of electric oscillations to be observed, and a source 3 of substantially constant frequency oscillations controlling the sweep and intensity of the electron beam and synchronizing the operation of the source 2 with the beam sweep.

The source of sine wave voltage 3 may be an oscillator of any well-known type, such as a crystal or resonant circuit oscillator, and preferably includes suitable means, such as a variable condenser, inductance, or the like controlled by a dial 4 for varying the frequency of the generated oscillations. The sine wave oscillations of selectable constant frequency from the source 3 are amplified and distorted by an amplifier 5 and supplied to a differentiating circuit comprising a capacitor 6 and a resistor 7 connected across the output of the amplifier 5.

A transformer 8 having its primary winding 9 connected across the resistor 7 supplies from its secondary winding 10 a series of recurrent voltage pulses to the input of an amplifying electron discharge device 11 having an anode 11a connected to a source of positive unidirectional potential B+. The input circuit of the discharge device 11 includes a source of negative bias potential such as a battery 12 connected in series circuit relation with the transformer winding 10 and a grid bias resistor 13. The high frequency oscillations from the transformer winding 10 are supplied to the control electrode of the discharge device 11 through a capacitor 14 connected in parallel circuit relation with the resistor 13. It will be understood that, because of differentiation of the distorted amplifier output wave in the circuit 6, 7, the output of the transformer 8 comprises an alternate series of positive and negative pulses. The negative voltage pulses supplied to the control electrode of the discharge device 11 have no effect, since the control electrode is normally biased negative and any negative voltage pulse serves only to drive the discharge device 11 farther into the cut-off region. The positive pulses from the transformer winding 10, however, overcome the negative bias from the source 12 thereby to render the discharge device 11 recurrently conductive for short intervals at a frequency determined by the frequency of the source 3.

The positive voltage pulses supplied to the input of the discharge device 11 are amplified and supplied as negative pulses from the anode of the device 11 to the anode of a regenerative pulse generating electron discharge device 15 having an anode 16, a cathode 17 and a control electrode 18. In response to the triggering impulses supplied to the discharge device 15 from the discharge device 11 a pulse generating circuit associated with the device 15 produces a series of recurrent voltage pulses having a frequency equal to the frequency of the triggering pulses. The pulse generating circuit associated with the discharge device 15 includes a pulse transformer 19 and a pulse-forming and pulse-determining capacitive storage element 20. The capacitive element 20 is preferably constituted by an open-ended artificial transmission line section made up of capacitors 21 and inductances 22. The anode 16 is connected through a primary winding 23 of the transformer 19 to the source of unidirectional current supply indicated on the drawing by B+. The open-ended transmission line section 20 is connected between the control electrode 18 and the grounded cathode 17 in series circuit relation with a resistor 24 and a secondary winding 25 of the pulse transformer 19. The resistor 24 preferably has a resistance substantially equal to the surge impedance of the transmission line section 20. The control electrode 18 is also connected to the cathode 17 through a suitable grid bias resistor 26 and a source of negative bias potential, such as a battery 27. The pulse output from the discharge device 15 is supplied from a tertiary winding 26 on the pulse transformer 19.

In operation, the pulse generating circuit including the discharge device 15 functions in the following manner. When a triggering impulse renders the discharge device 11 conductive, current from the positive potential source B+ through the primary winding 23 of the pulse transformer 19 to the anode of the discharge device 11 induces at the ungrounded end of the secondary winding 25 of the pulse transformer 19 a positive potential, thereby driving the control electrode 18 of the discharge device 15 positive and impressing across the input end of the transmission line 20 a short voltage pulse. The discharge device 15 thereupon begins to conduct. The additional current through the transformer winding 23 resulting from conduction of the device 15 induces an additional positive potential in the winding 25, so that the control electrode 18 is driven more positive and the discharge device 15 driven rapidly to saturation. Conduction continues until the voltage pulse impressed across the input end of the transmission line 20 travels to the remote open end and reflects back to the input end. This reflected pulse is of such polarity and intensity that it drives the control electrode 18 of the discharge device abruptly negative and beyond cut-off, thereby suddenly terminating conduction in the device 15. Thus, the period of the pulses derived from the output of the discharge device 15 is determined by the reflection characteristics of the transmission line section 20, and the frequency of the pulses is determined by the frequency of the triggering impulses received from the discharge device 11. It will, of course, be understood that the maximum permissible triggering frequency is limited by the time necessary for the transmission line 20 to discharge through the resistor 26.

A regenerative pulse generating circuit of the type described immediately above is described and claimed in the copending application of Harold W. Lord, Serial No. 464,033, filed October 31, 1942, issued July 6, 1948, as Patent No. 2,444,782 and assigned to the same assignee as the instant application.

The voltage pulses derived from the output winding 28 of the pulse transformer 19 are supplied to the input circuit of an amplifying electron discharge device 30 having an anode 31, a grounded cathode 32, and a control electrode 33. The pulse transformer winding 28 is connected between the cathode 32 and control electrode 33 in series circuit relation with a suitable source of negative bias potential, such as a battery 34 and a grid bias resistor 35 shunted by a capacitor 36. The anode 31 of the amplifying discharge device 30 is connected to the positive potential source B+ through a primary winding 37 of a three-winding pulse transformer 38. Positive pulses appearing at the upper terminal of the pulse transformer winding 28 in response to recurrent pulsed conduction of the discharge device 15 recurrently render positive the control electrode 33 of the discharge device 30 thereby to produce amplified negative voltage pulses upon the anode 31 of the device 30. These amplified pulses appear across the primary winding 37 of the pulse transformer 38 and induce pulses of opposite polarity in a pair of oppositely wound secondary windings 39 and 40 on transformer 38.

The pulse transformer winding 39 is grounded at one end and connected at its other end to supply positive pulses through a coupling capacitor 41 to a control electrode or grid 42 of the cathode ray discharge device 1. The discharge device 1 comprises an evacuated discharge envelope 43 having at one end a grounded cathode 44 and at the other end an anode 45. A suitable source of unidirectional current supply, such as a battery 46, is connected between the cathode 44 and anode 45, and the cathode ray discharge is controlled by the grid or control electrode 42. The grid 42 is provided with a negative bias from a source 42a through a resistor 42b. When the electrode 42 is sufficiently positive to permit the projection of an electron beam from the cathode 44 toward the anode 45, the beam passes between two pairs of deflecting plates 47 and 48 and falls upon a sensitive screen 49 of a suitable fluorescent material. The deflecting plates 47 and 48 are preferably arranged to deflect the beam laterally along mutually perpendicular axes.

The pulse transformer winding 40 on the pulse transformer 38 is connected at one end to the positive potential source B+ and at the other end through a unilateral conducting device, such as a diode rectifier 50, to the anode 51a of an electron discharge device 51, and is so disposed that voltage pulses induced in the winding 40 in response to voltage pulses in the winding 37 oppose the voltage of the source B+. The intensity of the voltage pulses in the winding 40 is substantially equal to or greater than the intensity of the voltage of the source B+. The electron discharge device 51 is preferably of the pentode type and includes, in addition to the anode 51a, a cathode 52, a control electrode or grid 53, a screen grid 54, and a suppressor grid 55. The cathode 52 is grounded and the control electrode 53 and suppressor grid 55 are connected together and to the cathode. The screen grid 54 is connected through a bias resistor 56 to the source of unidirectional potential B+ and through a condenser 57 to ground. The positive bias impressed upon the screen grid 54 through the resistor 56 is sufficient to render the discharge device 52 normally conductive. Furthermore, it is well known that the arrangement of the remaining grids in a pentode discharge device of this character is such that the magnitude of anode current remains substantially constant over a wide range of anode potentials.

A plurality of capacitors 58, 59, and 60 are arranged to be selectively connected between the anode 51a and cathode 52 of the discharge device 51 by means of a selector switch 61. As shown on the drawing, the low capacitance point 62 of the selector switch 61 is an open circuit. In this connection, the only capacitance between the anode and cathode is that introduced in the circuit by the interelectrode capacity itself and the capacitance of the various leads and selector switch parts.

The circuit including the discharge device 51, the diode rectifier 50, and the capacitors 58, 59, and 60 generates a saw-tooth voltage wave utilized to effect a recurrent timing sweep of the cathode ray beam along one axis of the fluorescent screen 49. For this purpose, the anode 51a of the discharge device 51 is connected to one of the horizontal deflection plates 48 in the cathode ray tube 43. The other plate 48 is grounded, so that the voltage between the plates 48 is that between the anode 51a and cathode 52 of the discharge device 51, as determined by the selected condenser 58, 59, or 60.

The sweep circuit described above operates in the following manner to produce saw-tooth os cillations. When no pulse voltage is present in the primary winding 37 of the pulse transformer 38, no voltage is induced in the tertiary winding 40. Thus, normally the diode rectifier 50 is conductive and current flows from B+ through the tertiary winding 40, the diode rectifier 50, and the positively biased pentode discharge device 51 to ground. During conduction of the discharge device 51 from the source B+, the selected condenser 58, 59 or 60 remains charged to a constant voltage equal to the voltage drop between the anode 51a and cathode 52 of the discharge device 51.

Whenever a voltage pulse appears in the transformer winding 37, a pulse of voltage is induced in the transformer winding 40 in such a direction as to oppose the voltage of the unidirectional voltage source B+. Since the pulse voltage is equal to or greater than the unidirectional voltage, the net voltage around the circuit including the diode rectifier 50 and pentode discharge device 51 is reduced to zero or reversed, so that the diode rectifier 50 becomes non-conductive and remains non-conductive for the period of the pulse. During this pulse period, the selected charged capacitor 58, 59, or 60 serves as a parallel voltage source and continues the discharge through the discharge device 51. Discharge of the capacitor through the source B+ is prevented by the diode 50. As the energy stored in the sweep capacitor 58, 59, or 60 diminishes, the voltage of the capacitor decreases. However, as previously pointed out, the current through the discharge device 51 remains constant over a wide range of anode voltages, so that the sweep capacitor is discharged at substantially constant current. As is well known to those skilled in the art, a constant current discharge of a capacitor effects a substantially linear decrease in capacitor voltage. It is the linearly decreasing sweep capacitor voltage which is applied between the horizontal deflection plates 48 of the cathode ray discharge device 43.

As soon as the voltage pulse in the pulse transformer winding 40 is terminated, the diode rectifier 50 again becomes conductive and the source B+ supplies current to the discharge device 51. When the rectifier 50 becomes conductive at the termination of a pulse, the voltage of the anode 51a of the discharge device 51 is raised suddenly, thereby abruptly to increase the charge and the voltage of the sweep capacitor 58, 59, or 60. Thus, the cathode ray beam is moved along the horizontal axis of the fluorescent screen 49 at a substantially constant rate determined by the rate of voltage diminution of the sweep capacitor during discharge to establish a time base for wave analysis and is suddenly returned to its starting point, when the sweep capacitor voltage is abruptly increased upon termination of the pulse voltage in the winding 40.

The sweep circuit comprising devices 50 and 51 and capacitors 58, 59, 60 is particularly claimed in our copending application Serial No. 663,319, filed April 19, 1946, which is a division of the present application.

The positive pulses appearing on the pulse transformer secondary winding 39 are supplied not only through the coupling condenser 41 to the control grid 42, but also through a lead 63 to a time delay or phase shifting circuit 64 to control a trigger pulse generator 65. Pulses in the transformer winding 39 are coincident in time with those in the transformer winding 40 which control the discharge of the sweep capacitors 58, 59, and 60. Pulses from the pulse generator 65 delayed in time with respect to pulses in the windings 39 and 40 are amplified in a discharge device 66 and supplied through a transformer 67 to trigger or render operative the source 2 of oscillations to be observed or analyzed. The oscillations to be analyzed from the source 2 are supplied to the vertical deflection plate 47 of the cathode ray discharge device 43. Thus, the single pulse transformer 38 serves to initiate the sweep, to simultaneously establish a cathode ray beam through control of the grid or intensifier 42, and to render operative the source 2 of observed oscillations through the time delay circuit 64 and trigger pulse generator 65. Thus, the trigger pulses are synchronized with and delayed in time with respect to the initiation of the beam sweep.

The time delay circuit 64 comprises a source of substantially constant unidirectional potential, such as a battery 68, connected in opposing series circuit relation with the pulse transformer secondary winding 39 across an integrating circuit consisting of a variable resistor 69 and capacitor 70. A primary winding 71 of a pulse transformer 72 is connected across the condenser 70 through a unilateral conducting device such as a diode rectifier 73. This circuit functions to establish in the transformer winding 71 a recurrent series of voltage pulses delayed in time or phase relation with respect to the series of recurrent voltage pulses appearing in the transformer winding 39.

The operation of the time delay circuit 64 depends upon the characteristics of the integrating circuit 69, 70. When no voltage pulse is present in the transformer winding 39 the battery 68 maintains the condenser 70 charged to the battery voltage. Whenever a pulse appears upon the transformer winding 39, the pulse voltage opposes the voltage of the battery 68. Since the pulse is of substantially rectangular wave shape and its intensity is greater than the voltage of the battery 68, the sudden reversal of voltage applied to the condenser 70 causes the condenser charge to decay exponentially to zero and then to reverse. As soon as the voltage of the condenser 70 reverses, the voltage applied to the unilaterally conducting circuit through the pulse transformer winding 71 is reversed, so that the diode rectifier 73 becomes conductive to apply a triggering pulse to the transformer winding 71. It will thus be evident that the time delay between the initiation of a pulse in the transformer winding 39 and the initiation of a pulse in the transformer winding 71 is determined by the time taken for the charge of the condenser 70 to decay exponentially to zero and to reverse sufficiently to render the discharge device 73 conductive. This time is determined by the resistance of the resistor 69 and the capacitance of the capacitor 70, and may suitably be controlled by utilizing a variable resistor 69, as indicated on the drawing. Upon termination of each pulse in the transformer winding 39, the battery 68 again reverses the charge upon the condenser 70 and brings it back to its normal value. The triggering pulse in the transformer winding 71 is not necessarily of the same duration as the initiating pulse in the transformer winding 39, but its duration is determined by the length of time for which the voltage of the capacitor 70 remains reversed by the voltage pulse in the transformer winding 39.

The time delay circuit 64 is particularly claimed in our copending application Serial No. 663,320, filed April 19, 1946, which is a division of the present application.

The pulse generating circuit 65 is similar to that previously described, comprising the artificial transmission line 20 and the electron discharge device 15. The pulse generating circuit 65 comprises an electron discharge device 74, an artificial transmission line 75, a source of negative bias potential such as a battery 16, a grid bias resistor 77, a resistor 78 between the transmission line 75 and the control electrode of the electron discharge device 74, and the pulse transformer 72. The operation of the pulse generating circuit 65 is entirely similar to that of the pulse generating circuit previously described, the only difference being that in the circuit 65 the triggering pulses are supplied through the transformer winding 71 rather than directly to the anode of the discharge device 74. An output winding 79 of the pulse transformer 72 supplies to the input circuit of the amplifying discharge device 66 a series of recurrent voltage pulses having a length or period determined by the characteristics of the transmission line 75 and a frequency determined by the frequency of the delayed triggering pulses derived from the pulse transformer 38. The amplifier 66 is similar to the amplifier 30 and its input circuit comprises a source of negative bias potential, such as a battery 80, a grid bias resistor 81, and a shunting capacitor 82. The amplified trigger pulses from the transformer 67 are supplied to the oscillation source 2 to render the source 2 operative in synchronism with the beam sweep. The oscillation source or generator 2 is connected to the vertical deflection plates 47 of the cathode ray discharge device 43.

By way of illustration of one application of our invention we have illustrated upon the fluorescent screen 49 a typical picture which may appear in the event that the oscillation source 2 is a radio direction and range finding apparatus of the type comprising a pulse transmitter and a receiver of echo or reflected pulses. In accordance with our invention, the cathode ray beam is turned on and horizontal sweep of the beam initiated at the beginning of each pulse appearing upon the transformer winding 37. The horizontal sweep of the beam traces a line 82 upon the fluorescent screen 49. Synchronously with the initiation of the beam sweep and in fixed time delay relation with respect thereto, triggering pulses are supplied to the source 2 through the circuit 64 to render the transmitter operative. Upon triggering of the transmitter, a transmitted pulse 83 appears upon the fluorescent screen 49 by operation of the source 2 and the vertical deflection plate 47. In the event that the pulse 83 encounters a detected object and is reflected back to the receiver of the source 2, a reflected pulse 84 will appear upon the fluorescent screen 49 a predetermined time after the pulse 83, as determined by the distance between the source 2 and the reflecting object. In this manner, the range of a reflecting object may be determined.

While we have shown and described only a preferred embodiment of our invention, many modifications will occur to those skilled in the art and we therefore wish to have it understood that we intend in the appended claims to cover all such modifications as fall within the true spirit and scope of our invention.

What we claim as new and desire to secure by Letters Patent of the United States, is:

1. An apparatus for analyzing the characteristics of transient electric waves derived from a triggered wave source comprising, in combination, means for projecting an electron beam against a sensitive surface, means for deflecting said beam along a first axis in response to said waves to be analyzed, a source of recurrent potential pulses each of predetermined duration, beam deflecting means controlled by said pulses for sweeping said beam across said surface along a second transverse axis during each of said pulses, each sweep being initiated at the leading edge of a pulse, means for integrating said pulses to produce a voltage which increases in one direction throughout said interval, means responsive to increase in said voltage above a predetermined value to initiate a delayed trigger pulse, means for triggering said wave source in response to said delayed pulse, and means for adjusting the rate of increase of said voltage thereby to adjust the delay between initiation of said sweep and triggering of said source.

2. An apparatus for analyzing the characteristics of transient electric waves derived from a triggered wave source comprising, in combination, a cathode ray device having a pair of coordinate deflecting means, means for impressing said waves to be analyzed upon one of said deflecting means, means comprising a sawtooth generator for impressing sweep voltages on the other of said deflecting means, a sourse of potential pulses of substantially rectangular wave shape and predetermined pulse width, means for synchronizing said sweep generator to initiate each sweep upon occurrence of the leading edge of a pulse, means for integrating said pulses to produce a voltage which increases in one polarity throughout each pulse, means for developing a trigger pulse each time said voltage increases to a predetermined value, means for triggering said wave source in synchronism with said trigger pulses, and means for varying the rate at which said voltage increases, thereby to vary the time delay between initiation of each potential pulse and the corresponding trigger pulse.

FRANK J. BIAS.
HAROLD W. LORD.

REFERENCES CITED

The following references are of record in the file of this patent:

UNITED STATES PATENTS

| Number | Name | Date |
|---|---|---|
| 2,114,611 | Schlesinger | Apr. 19, 193 |
| 2,248,581 | Norgaard | July 8, 194 |
| 2,292,835 | Hepp | Aug. 11, 194 |
| 2,294,863 | Hadfield | Sept. 1, 194 |
| 2,300,632 | Poch | Nov. 3, 194 |
| 2,313,906 | Wendt | Mar. 16, 194 |
| 2,373,145 | Sensiper et al. | Apr. 10, 194 |